July 4, 1967 R. F. LUPARDO 3,329,138
INTERNAL DIAMETER CUTTING WHEEL ASSEMBLY AND
PROCESS FOR MANUFACTURING SAME
Filed Feb. 4, 1964
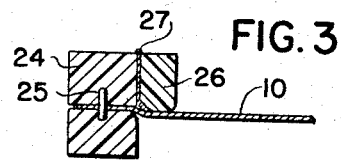
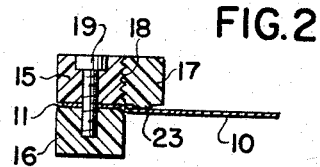
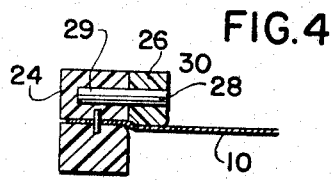
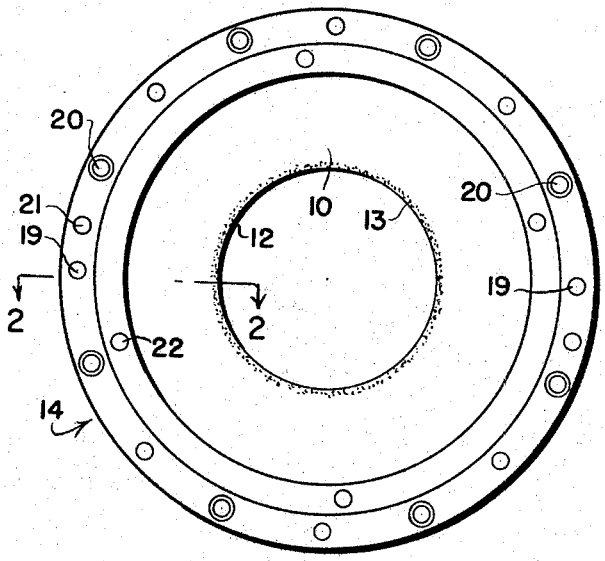
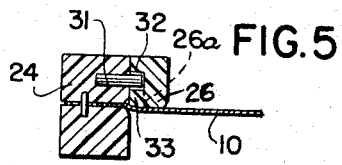
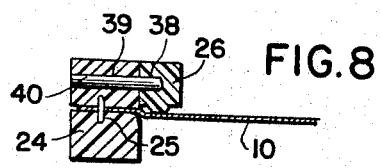
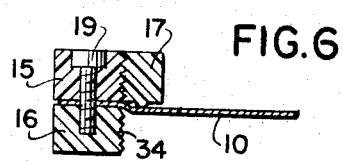
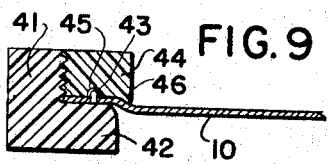
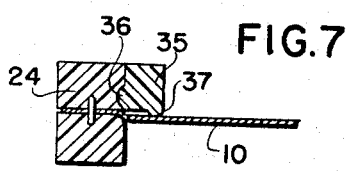
INVENTOR.
Robert Francis Lupardo
by *Joseph Hirschmann*
ATTORNEY.

3,329,138
INTERNAL DIAMETER CUTTING WHEEL ASSEMBLY AND PROCESS FOR MANUFACTURING SAME
Robert Francis Lupardo, Washington Township, Westwood, N.J., assignor to I.N.M. Industries Corporation, New York, N.Y., a corporation of Delaware
Filed Feb. 4, 1964, Ser. No. 342,339
17 Claims. (Cl. 125—15)

The present invention relates to cutting wheels or discs of annular form and provided at their inner periphery with a cutting surface or edge for cutting thin wafers of crystals and minerals generally, ceramic material, metals and the like, and has for its general object to provide an improved pre-tensioned assembly of such wheels and their holding ring structure, and to a process for manufacturing such pre-tensioned assemblies.

More particularly, it is an object of the invention to provide what may be termed disposable or "throw-away" pre-tensioned internal diameter (ID) cutting wheel assemblies which can be manufactured at such reduced cost in time, skill and material, that a worn wheel can be discarded together with the holding ring structure without appreciable loss.

Internal diameter (ID) annular cutting wheels or discs are supplied with the circular cutting edge on their internal periphery, usually in the form of a coating having diamond dust suspended therein, to operators of cutting, slicing or wafering machines having a spindle or shaft on which the wheel is mounted with the aid of steel rings between which the wheel is clamped with screws and tensioned. These steel rings must be manufactured according to high precision standards and are consequently of high cost, and must therefore be continually re-used.

The operation of tensioning an ID wheel requires a considerable degree of care and skill, and as a cutting machine may require several replacements of worn-out wheels in the course of a day, the time lost in properly centering and tensioning the wheels within the holding ring and mounting the same on the spindle is very considerable. Thus, in one method of preparing a tensioned ID wheel assembly, there are employed two steel rings, one of which has a convex and the other a concave surface, between which the wheeel is clamped in such manner that a radial tension is created therein. To effect the assembly, the convex ring is first placed upon a centering fixture which includes an annular base shoulder and a centrally disposed and axially movable centering sleeve which consists essentially of a cone-shaped member and a knurled knob for rotating it counter-clockwise or clockwise to raise or lower the cone member. The ring with the convex surface is first placed over the base shoulder and the cutting wheel is then placed in position over the centering sleeve with its peripheral region over the convex area of the ring. The centering sleeve knob is then turned counter-clockwise until the sleeve touches the cutting edge of the wheel. A hold-down plate is now placed over the sleeve and upon the wheel, and is centered as closely as possible. The centering sleeve is then turned counter-clockwise until the sleeve meets resistance, and tends to turn the hold-down plate and cutting wheel, the wheel being now in centered position. The outside or concave ring is now placed upon the convex ring, while the hold-down plate is held by hold-down clamps to lock the hold-down plate and cutting wheel in place.

The second ring is then rotated until screw holes therein are brought into registry with threaded holes in the convex ring. Clamping screws are then inserted into the screw holes and tightened to apply tension to the cutting wheel as the two rings are forced together. The clamps are then released and the hold-down plate is removed. The assembly is now rotated off the centering sleeve and base shoulder, and is then mounted on the spindle.

In another known method of centering and tensioning an ID wheel between a pair of clamping steel rings there is again employed a centering device which includes a cone-shaped member, and also three centering chuck jaws. The centering device includes a ring provided with dowel pins by means of which a first clamping ring with flat surfaces is positioned on the centering device. The clamping face of the ring is provided with knurls and a V-groove designed to grip the peripheral region of the cutting wheel.

After placing the ID wheel upon the first ring, the chuck jaws are expanded against the inside periphery of the wheel and thereby center it. The wheel and chuck are then rotated to effect matching of cap screw-holes in the first ring and wheel. A second or lock ring is then positioned over the wheel, such ring being provided with a V-rib which mates with the V-groove in the first ring. Cap screws are then applied to bind the two rings with the wheel there between for providing an initial tensioning.

The second ring is internally threaded, and there is then screwed into such ring an externally threaded tensioning ring, which is turned until it bears against the surface of the cutting wheel. Futher rotation of the tensioning ring, as with a spanner wrench, develops radial tension in the cutting wheel. The assembly is then mounted on the cutting machine.

It will be evident that in the first known method of tensioning the cutting wheel, it is difficult to control the degree of tension in the cutting wheel, and in both known methods, a high degree of skill is required to produce the proper tension.

The known methods of manufacture of the cutting wheels and of mounting the same upon the spindle or drum of the wafering machine have a number of further disadvantages. So far as the manufacture of the wheel itself is concerned, it has been the practice to apply the abrasive coating composed of a suitable matrix having diamond particles suspended therein to the inner peripheral region of the wheel while the wheel is in the untensioned condition. The subsequent tensioning of the wheel unavoidably produced stresses in the coating which had to be taken into account in the formulation of the coating, else the danger was present that the coating would crack or break away, which would impair the usefulness of the wheel. Also, the mounting of the wheel coaxially with the axis of the supporting drum, and the tensioning of the wheel to the proper degree, require a high degree of skill and consume considerable time, so that the "down-time" in setting up the machine represents a considerable item of cost. In particular, it is difficult, except with the exercise of extreme care and skill, to subject successive wheels to substantially the same degree of tension in the holding ring structure when worn-out wheels are replaced by new wheels.

A further important objection to heretofore known modes of mounting of the cutting wheels is that the steel clamping rings possess considerable weight, so that when the mounting is not perfectly coaxial with the spindle or drum, undesirable vibrations set in which affect the cleanness and accuracy of the cut and increase the noise accompanying the use of the wafering machine.

An additional difficulty encountered heretofore in the mounting of ID cutting wheels has resulted from the fact that the mounting holes were frequently oversize, so that centering the wheel required special care, since the central aperture must be as completely concentric with the axis of the spindle or drum as possible. This again was time-consuming. The use of ID cutting wheels as heretofore manufactured accordingly made necessary the employment of a highly skilled mechanic and the provision of the proper tools by each user of the wheels.

According to the present invention, there are eliminated both the danger of injury to the cutting edge by the placing of the wheel under tension by the user, and also the need by the user for a skilled mechanic for mounting and tensioning the wheel, while the time required for setting up the machine is greatly reduced.

I accomplish the above-mentioned and other objects by mounting and tensioning the wheel in a holding ring assembly of inexpensive character, the pre-tensioned assembly being supplied to the user ready for immediate mounting on the spindle of the wafering machine. I have found that a tensioned wheel can be safely and securely held by a holding ring formed by casting or molding inexpensive materials in contrast to the finely machined and drilled, and consequently expensive, steel rings heretofore employed. Whereas prior to the present invention the manuufacturer of the wheels, or the applier of the diamond coating, could not market the wheels in the pre-tensioned condition, since he could not provide a steel ring holding assembly with each wheel, the rings being far more costly than the wheels, my invention makes it possible to market pre-tensioned assemblies in view of the negligible cost of the cast or molded ring structure. The finished assembly, ready for use, can be produced by a single manufacturer, or the uncoated wheel, pre-tensioned in its holding ring structure, can be supplied to the plant at which the diamond or other abrasive coating is applied. The present practice of tensioning an already coated wheel can, however, be followed to the extent of utilizing such coated wheel in the manufacture of a pre-tensioned assembly in accordance with my invention.

The present invention thus makes it possible to market, at little extra cost, a uniformly balanced and tensioned wheel, properly centered within a mounting means of a "throw-away" type, so that the use of the expensive steel rings above referred to is obviated.

The mounting means of my invention consists preferably of a rigid plastic ring assembly within which the outer peripheral region of the wheel is clamped or anchored, various measures or means of simple and inexpensive character being employed to place the wheel under tension.

The present invention further makes it possible to apply the cutting surface or edge to the inner periphery of the cutting wheel while it is in the tensioned condition within the holding ring assembly. The state of tension of the cutting surface of the wheel thus remains constant, being neither relaxed nor increased. Also, the pre-tensioning of the ring by the manufacturer makes it possible to punch the central opening while the wheel is under tension, so that no distortion results, as is sometimes the case when the central hole is first punched out, and the cutting edge then applied, after which the wheel is placed under tension by the user by rotation of the threaded steel tensioning ring or otherwise. The manufacture of the wheel in the form of a pre-tensioned assembly thus makes possible the rough punching out of the central hole prior to assembly and tensioning, and the final stamping of the hole to exact size and circular shape and concentricity after the wheel has been placed under tension within its ring holding means. Also, the degree of tension can be made more uniform by the manufacturer who can afford special tools which, for reasons of economy, would not be available to users of the wheels, whose mechanic would have to determine the proper degree of tension by the more or less subjective "feel"; and in the absence of a high degree of skill and long experience of the mechanic, the danger would ever be present of overtensioning beyond the elastic limit of the wheel with resultant distortion and spoilage. In addition, since the wheels may be made of stainless or other steel, phosphor bronze, copper, and other metals, a change from one type of wheel to another would require a re-education of each user with regard to the tensioning of the wheel.

The present invention thus provides a novel cutting wheel assembly with which the wheel is supplied to the user in pre-tensioned condition and ready, by means of the ring structure at its outer periphery, to be mounted upon the spindle or drum with or without the aid of shims or an adapter, depending upon the structure of any particular spindle or drum. As the central opening of the wheel can be easily located concentrically of the ring holding means at the plant of the manufacturer, the simple mounting of the outer ring assembly on the spindle or drum enables the user properly to center the cutting wheel without difficulty. When the wheel becomes worn, the whole assembly can be thrown away and replaced by a new one.

The plastic holding ring means can be made of a material such as polyvinyl chloride, high impact styrene polymer, or the like, which will resist the action of any chemical agents employed during the application of the cutting edge. Because of the low specific gravity of the plastic ring structures, undesirable vibration is avoided even if the centering is not as accurate as has heretofore been imperative for the steel clamping and tensioning rings.

The above and other objects and advantages of the present invention will be apparent from the following more detailed description thereof, taken together with the accompanying drawings, wherein:

FIG. 1 is a top plan view of a complete pre-tensioned internal diameter cutting wheel assembly showing the cutting wheel clamped by plastic holding rings at its outer peripheral region, and placed under radial tension by a plastic tensioning ring;

FIG. 2 is a partial section along the line 2—2 of FIG. 1; while

FIGS. 3 to 9 are partial cross-sectional views similar to FIG. 2, but showing alternative means and methods for anchoring the cutting wheel in the holding ring structure and creating radial tension therein.

Referring to the drawings, there is shown in FIG. 1 a thin annulus or wheel 10 whose outer periphery is indicated at 11 and its inner periphery at 12. The wheel 10 is made of any suitable material, preferably metal, such as phosphor bronze, copper, steel, or the like. The inner peripheral region of the annulus is provided with an abrasive cutting surface 13 consisting essentially of diamond particles or dust suspended in a suitable matrix, and adhering to the edge and for a short distance along the side of the inner peripheral region. The abrasive coating can be applied in any known manner, and as it forms no part of the present invention, it need not be further described.

As shown in FIG. 1, the assembly includes an outer or holding ring structure, shown generally at 14, and consisting of superposed rings 15 and 16 (FIG. 2), and a tensioning ring 17 which is threadedly engaged with the ring 15, as indicated at 18. This structure is similar to the assembly heretofore constructed by the user of the cutting wheel who employed finely machined steel holding and tensioning rings and himself created the radial tension in the wheel by operation of the tensioning ring.

In accordance with the present invention, the rings 15, 16 and 17 are made of an inexpensive material, such as a molded or cast thermoplastic or thermosetting synthetic resin, like rigid polyvinyl chloride, high impact strength styrene polymer, various copolymers, cured polyester and epoxy resins, and the like. The holding ring structure can accordingly be provided by the manufacturer of the wheel or at the plant where the abrasive cutting edge is applied.

Whereas heretofore it was the user of the wheel who placed it under tension, as above described, this function can now be performed more economically, more accurately, and more uniformly, by the manufacturer of the cutting wheel itself, as he can assemble the inexpensive holding ring structures with the wheel and subject the latter to radial tension in various ways and under standardized conditions. One way of so doing is indicated in FIG. 2, wherein the threaded plastic tensioning ring 17 is provided with an annular rib 23 which, as the ring 17 is rotated inside the threaded ring 15, engages the wheel and subjects it to increasing tension as the rotation of ring 17 clockwise continues. The degree of rotation can be kept uniform by the manufacturer, who can also employ relatively expensive instruments for determining the degree of tension.

As noted above, the manufacturer can assemble with the holding rings either a finished wheel, with the cutting edge already provided, or can tension a cutting wheel blank, and then have the diamond coating applied. The wheel and holding ring assemby can then be supplied to the user with the wheel in pretensioned condition.

It will be apparent also that at the plant of the manufacturer the wheels can be centered more expeditiously than by the user, and a more nearly perfect circle attained, and hence a better balanced wheel and greater freedom from vibration, by first punching out an undersized hole in the wheel blank and, after it has been tensioned, stamp or punch out the excess material to leave a practically perfectly centered circular opening.

As with the machined steel holding rings now in use, the wheel 10 is locked to the rings 15 and 16 by means of Allen screws 19 (not visible as such as FIG. 1, which shows the reverse face of the ring), the wheel being provided with holes registering with holes in the rings for the passage of the screws therethrough. The openings for the Allen screws in ring 15 are unthreaded, while the registering openings in the ring 16 are threaded to receive the screws or are provided with lead anchors or sleeves in which the screws cut a thread. Holes 20 have enlargements at both ends to receive cap screws from either side for securing the assembly directly to the drum of the wafering machine or to an adapter mounted on the spindle, while holes 21 register with holes in the drum or adapter and receive pins for initial rough centering, after which the pins are removed. The tensioning ring 17 is provided with holes 22 for receiving a spanner wrench for rotating the same.

FIGS. 3 to 9 show various ways of securing the wheel to the resinous or other inexpensive holding ring structure and creating the desired pre-set radial tension therein. In FIG. 3, the plastic rings 15 and 16 of FIG. 2 have been combined into a single molded or cast ring 24, the wheel 10 being embedded in the ring during the casting or molding thereof. Pins 25 may be arranged in spaced relation circumferentially to lock the wheel 10 to the ring 24. The tensioning ring 26 can now be applied in a press and is forced against the wheel 10 under such pressure that the necessary radial tension is created in the wheel. The ring 26 is then cold-welded to ring 24, by means of a solvent or a resin adhesive, as indicated at 27; and after hardening of the adhesive, the pressure on ring 26 is released.

FIG. 4 shows a mounting means similar to FIG. 3, except that in place of the adhesive or other cold welding means 27, there are employed pins 28, preferably of the expanding type, which pass through registering radial openings 29 and 30 in rings 24 and 26, it being understood that a number of pairs of such registering openings are circumferentially distributed along the rings.

In the construction shown in FIG. 5, the wheel 10, as in FIG. 4, is embedded in the unitary plastic holding ring 24. A number of metallic pins 31 project from the ring and are received in bayonet slots 32 in the tensioning ring 26, the bayonet slots including axially extending portions 33 which are passed over the projecting portions of the pins, and the ring then rotated slightly to lock the ring to the pins. The dimension of the tensioning ring is such that in its locked position, its bottom face has depressed the body of wheel 10 for an axial distance sufficient to create the desired radial tension in the wheel.

The structure of FIG. 6 is similar to that of FIG. 2, except that the ring 16 is provided with an internal thread 34, by means of which it may be screwed onto the drum or adapter on the wafering machine. It will be evident that the rings 15 and 16 can be made integral, as in FIGS. 3, 4, and 5, in which case the screws 19 and the corresponding holes can be omitted.

The holding ring structure of FIG. 7 includes a unitary plastic ring 24 which is molded with the peripheral region of the wheel 10 embedded therein. In this construction, the tensioning ring 35 is provided with a radially extending rib 36, which is so located that when the ring 35 is forced into ring 24 and snaps into the corresponding annular depression in ring 24, the axially extending annular rib 37 has deflected the wheel 10 sufficiently to create the necessary tension therein. The necessary resilience of the ring 35 is present in a large number of resin materials; but where necessary, the ring 35 may be split to allow for initial contraction as the rib 36 passes over the upper edge of ring 24.

FIG. 8 shows an arrangement in which the ring 26 is depressed sufficiently in a suitable press to create the necessary radial tension in wheel 10, and at such point radial openings 38 register with similar openings 39 in the ring 24, whereupon holding pins 40 are introduced into the openings, the pins being preferably of the expanding type to take up any clearance. If desired, the holes 38 and 39 can be threaded to receive suitable screws which are introduced from the outer circumference of ring 24.

Finally, FIG. 9 shows a further modification in which the holding ring structure is integral but is of L shape, and includes an upwardly extending leg or portion 41 and a horizontally extending leg or portion 42. The upper surface of the horizontal leg 42 has a number of lugs, pins or projections 43 which are received in suitable openings in the outer peripheral region of the wheel 10. The inner circumference of the leg 41 is threaded, and receives an externally threaded tensioning ring 44 which has an annular groove 45 which clears the pins 43. The ring 44 has a downwardly extending portion 46 which engages the wheel 10 and places it under radial tension as the ring is rotated clockwise within the holding ring leg 41. To avoid the necessary close dimensioning of the ring 44 to effect simultaneously the clamping of the wheel to the ring 41 and the desired degree of tensioning of the wheel, the wheel can be adhesively bonded to ring 42, as with epoxy or polyester resin cement or other adhesive, or it may be riveted or stapled to ring 41.

As described above, the attachment of the internal diameter cutting wheel blank, or, if desired, a blank already provided with a cutting edge, to the holding ring structure, and the placing of the wheel under tension, can be accomplished in various ways. Thus the cutting wheel can be clamped between two plastic rings or embedded in a unitary ring and then subjected to tension by means of a third ring which is either threadedly engaged with one of the holding rings or is unthreaded and is forced in a suitable press against one face of the wheel adjacent to the holding ring structure (whether of one or two parts), until the desired degree of tension is created in the wheel, whereupon the tensioning ring is secured to the holding ring structure by suitable fastening means or by means of a "cold weld" solvent, or an adhesive for the plastic material.

The cutting wheel can also have the holding ring structure molded directly upon its outer peripheral region while under tension, as by making the wheel oversized, seizing its outer peripheral region by means of gripping means distributed about its circumference which are then placed under tension, after which the holding ring structure is molded on both sides of the wheel, suitable openings in the wheel being disposed about its circumference in such manner that the molding material passes therethrough to unite the opposite parts of the ring structure into an integral ring; or the wheel can be provided with ribs or projecting lugs or bosses which become embedded in the molded ring structure and lock the wheel to the molded rings. After release of the tensioning means, the excess portion of the wheel extending beyond the molded ring structure can then be cut off and the cutting edge applied to the internal periphery if it was not previously provided on the wheel blank. By this mode of manufacture the tensioning ring can be eliminated.

The axial length of the tensioning rings 17, 26 and 44 should preferably be such that in their final position, their upper face (as viewed in FIGS. 2 to 9) is either flush with the upper surface of the outer rings 15, 24 or 41, or is below such surface.

The tensioning of the wheel before the abrasive coating is applied has the further important advantage from its standpoint of economy in that a thinner coating of the diamond abrasive can be used while at the same time less of the material being wafered is lost in the kerf. Heretofore, because the untensioned wheel blank was not entirely flat, an abrasive coating of an average thickness of about 0.002 inch had to be applied in order to make certain that the coat was continuous and of at least a minimum thickness throughout of, say, 0.001 inch. By first tensioning the blank, so that it is maintained flat, a continuous coat of 0.001 inch can be applied, so that, since the maximum thickness of the coat in known wheels could be as high as 0.003 inch, if not higher, on each side, the kerf is reduced by at least about 0.002 inch and as much as about 0.004 inch by the present invention.

While important advantages are obtained by conducting the step of providing the inner periphery of the cutting wheel with a cutting edge only after it has been placed under radial tension within the holding ring structure, my invention is not limited to this feature and embraces assemblies and procedures wherein an annulus which has already been provided with a cutting edge on its inner periphery is placed under radial tension in a relatively inexpensive holding ring structure. This holding ring structure, while preferably made of rigid molded or cast resin, can also be made of die-cast metal or otherwise cast or molded metal provided the metal is sufficiently rigid and is so relatively inexpensive that it is economical to throw it away with the worn ring in view of the economies obtained in other respects; for it is the disposability of the ring structure that makes it possible to market an assembled, pre-tensioned cutting wheel.

It will be understood that where the drum of the wafering machine is of the type that has a circumferential ridge or rib for tensioning the wheel of known assemblies as they are secured to the drum, or where the drum is of a different diameter than the tensioned assembly of the present invention, a suitable adapter is employed which is permanently attached to the drum and provides a flat annular surface of suitable diameter, the adapter having threaded holes to receive screws passing through the rings 15 and 16 of FIGS. 1 and 2, or equivalent structure of the other embodiments of the invention.

The resinous composition employed for molding or casting the holding and tensioning rings can be reinforced by the use of various fillers or inserts, such as cellulosic and glass fibers, wires, and the like.

Where in the claims reference is made to a relatively inexpensive holding ring structure for the ID cutting wheel, this expression is to be understood to mean that the ring structure is so much cheaper than the machined steel rings presently in use, that when the wheel is worn, the whole assembly can be thrown away, the cost of the holding ring structure being more than compensated by the advantages above described.

I claim:

1. As an article of manufacture, a pre-tensioned internal diameter cutting wheel assembly adapted to be supplied to the user with the wheel in pre-tensioned condition and to be secured as a unit, with the wheel in pre-tensioned condition, and to a predetermined degree, to a rotating part of a rotary cutting machine, said assembly comprising a thin annular wheel having a cutting edge on its inner periphery, a holding ring structure to which the outer peripheral region of the wheel is secured, a tensioning ring engaging the wheel radially inwardly of the holding ring structure and acting to bend the wheel about the inner edge of the said structure to create radial tension in the wheel, and means provided in the ring structure for securing the assembly as a unit to the rotating part of the cutting machine.

2. A pre-tensioned cutting wheel assembly according to claim 1, wherein the holding ring structure is composed of plastic material.

3. A pre-tensioned cutting wheel assembly according to claim 2, wherein the plastic material is a rigid polyvinyl chloride resin.

4. A pre-tensioned cutting wheel assembly according to claim 1, wherein the cutting edge comprises an abrasive coating on its inner periphery applied to the tensioned wheel after the tensioning of the latter, said coating being thus free of tension.

5. As an article of manufacture, a pre-tensioned internal diameter cutting wheel assembly adapted to be supplied to the user with the wheel into a predetermined degree pre-tensioned condition and to be secured as a unit to a rotating part of a rotary cutting machine, said assembly consisting essentially of a thin metallic annulus having an abrasive coating on the internal periphery thereof, a holding ring structure to which the outer periphery region of the annulus is secured, tensioning means engaging the annulus inwardly of the holding ring structure and acting to bend the annulus about the inner edge of the said structure to place the annulus under such radial tension that it resists forces tending to distort it out of its plane, and means provided in the ring structure for securing the assembly as a unit, with the annulus in the pre-tensioned condition, to the rotating part of the cutting machine.

6. A cutting wheel assembly according to claim 5, wherein the holding ring structure is composed of plastic material.

7. A cutting wheel assembly according to claim 5, wherein the plastic material is a rigid polyvinyl chloride resin.

8. A disposable cutting wheel assembly according to claim 1, wherein the holding ring structure is made of a material lighter than steel.

9. A disposable cutting wheel assembly according to claim 1, wherein the holding ring structure consists essentially of an integral ring of molded resin within which the outer peripheral region of the wheel is embedded under radial tension.

10. A disposable cutting ring assembly according to claim 1, wherein the holding ring structure comprises a molded ring within which the outer peripheral region of the wheel is embedded, and a molded tensioning ring disposed internally of the first-mentioned ring and secured thereto, said tensioning ring bearing against the cutting wheel internally of the inner periphery of the holding ring structure and maintaining the wheel under radial tension.

11. A disposable cutting wheel assembly according to claim 1, wherein the holding ring structure comprises two molded plastic rings between which the outer peripheral region of the cutting wheel is clamped, one of said rings being internally threaded, and an externally threaded molded tensioning ring interengaged with the last-mentioned ring and bearing against the cutting wheel internally of the inner periphery of the other of the holding rings and thereby maintaining said wheel under tension.

12. A holding ring structure for internal diameter cutting wheels, comprising a pair of rings of rigid material of a diameter adapting them to grip between them the outer peripheral region of a cutting wheel annulus, means for clamping the rings together, one of the rings being internally threaded, and a third ring of rigid material externally threaded and threaded into the internally threaded ring and having a projection radially inwardly of the inner edge of the other of said pair of rings to bend the annulus about said edge and thereby placing the cutting wheel under tension.

13. A holding ring structure according to claim 12, wherein the rings are made of a rigid polyvinyl chloride resin.

14. In a process for the manufacture of a pre-tensioned cutting wheel assembly for mounting on an internal diameter cutting machine, the steps which comprise roughly punching a central hole in a circular cutting wheel blank, mounting the punched blank within a holding ring structure under tension, and then finish-punching the hole concentrically with the holding ring structure.

15. A saw assembly comprising a saw member of thin metallic material, and means for holding the saw member in tensioned condition, said saw member having an abrasive coating on its cutting edge which is not under tension by reason of having been applied to the saw member while said saw was in the tensioned condition.

16. Process for the manufacture of a pre-tensioned cutting wheel assembly, for mounting on an internal diameter cutting machine, comprising securing the peripheral region of a thin metallic annulus to a holding ring structure, then placing the wheel under radial tension, and then providing the internal peripheral region of the wheel with a cutting edge while said wheel is maintained under tension.

17. A disposable internal diameter cutting wheel assembly comprising a holding ring of L-shaped cross-section and composed of resinous material, the vertical leg of the ring being threaded on its inner face, a tensioning ring threaded on its outer face and threadedly engaging the holding ring, and an internal diameter cutting wheel disposed between the tensioning ring and the horizontal leg of the holding ring, the tensioning ring having an axially extending protuberance engaging the wheel internally of the horizontal leg of the holding ring under tension.

References Cited

UNITED STATES PATENTS

| | | | |
|---|---|---|---|
| 1,009,467 | 11/1911 | Bryant | 84—411 |
| 2,361,492 | 10/1944 | Pare | 76—112 |
| 2,485,985 | 10/1949 | Perry | 84—411 |
| 2,713,339 | 7/1955 | Sayers | 125—15 |
| 2,721,488 | 10/1955 | Eaton | 76—112 |
| 2,979,981 | 4/1961 | Ludwig | 84—411 |
| 3,039,235 | 6/1962 | Heinrich | 51—73 |

HAROLD D. WHITEHEAD, *Primary Examiner.*